United States Patent [19]

Bremer et al.

[11] Patent Number: 6,034,985
[45] Date of Patent: Mar. 7, 2000

[54] REMELTING METHOD FOR RECOGNITION AND RECOVERY OF NOBLE METALS AND RARE EARTHS

[76] Inventors: Siegfried M. K. Bremer, deceased, late of Scottsdale; by Irma Bremer, personal representative, 7340 E. Sweetwater Ave., Scottsdale, both of Ariz. 85260

[21] Appl. No.: 09/184,248

[22] Filed: Nov. 2, 1998

[51] Int. Cl.$^7$ ...................................................... H05B 7/07
[52] U.S. Cl. ................................. 373/67; 373/15; 373/108
[58] Field of Search .................................. 373/2, 9, 11, 15, 373/21, 60–63, 67, 68, 108; 75/10.19, 10.4, 10.25, 10.28, 710, 741; 205/125, 138, 240, 566, 565; 423/493

[56] References Cited

U.S. PATENT DOCUMENTS

| | | | |
|---|---|---|---|
| 3,979,205 | 9/1976 | Wanzenberg | 75/10.19 |
| 4,892,631 | 1/1990 | White | 205/565 |
| 5,142,549 | 8/1992 | Bremer | 373/10 |
| 5,263,044 | 11/1993 | Bremer | 373/15 |
| 5,853,692 | 12/1998 | Lee et al. | 423/493 |

*Primary Examiner*—Tu Ba Hoang
*Attorney, Agent, or Firm*—H. Gordon Shields

[57] ABSTRACT

Method for recognition of noble metals otherwise not recognizable in base material clusters includes using an electric arc furnace in which base material clusters are disintegrated to free atoms or are alloyed with other components of the base materials, and are able to be recovered by conventional recovery techniques once they are recognized. The base material includes the products of smelting processes, pellets of compacted raw material, like anode mud or waste material, and the base materials are melted utilizing the heat from a dc electric arc furnace.

6 Claims, 3 Drawing Sheets

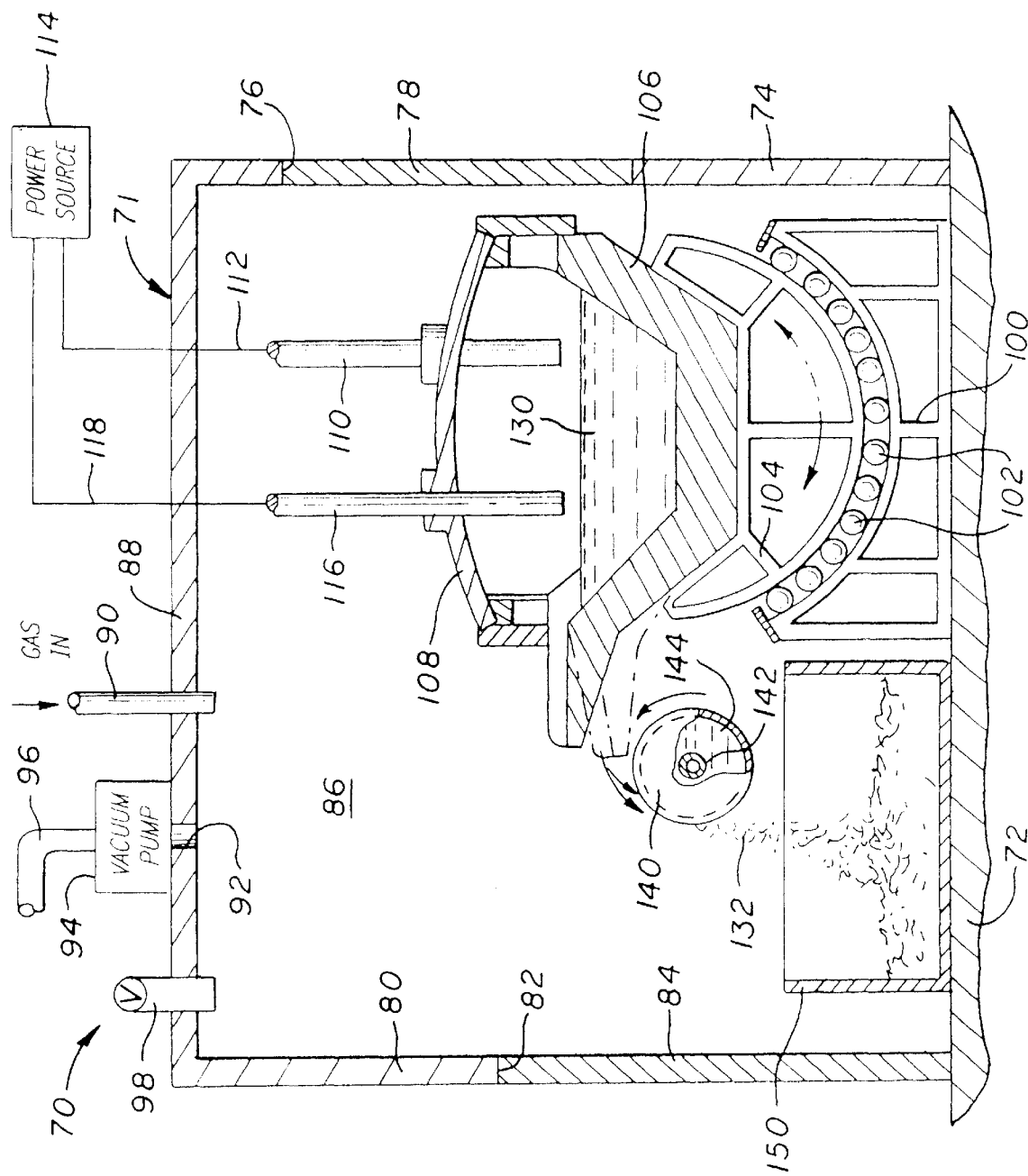
F I G. 2

REMELTING METHOD FOR RECOGNITION AND RECOVERY OF NOBLE METALS AND RARE EARTHS

BACKGROUND OF THE INVENTION

1. Field of the Invention

This invention relates to the recognition and recovery of noble metals and, more particularly, to the remelting of materials to allow certain metals, such as noble metals and rare earths, which may not otherwise be recognized, to be recognized and to be recovered.

2. Description of the Prior Art

Prior to the development of the apparatus and method developed by the present inventor as found in his prior U.S. Pat. No. 5,142,549, dated Aug. 25, 1992, and U.S. Pat. No. 5,263,044, dated Nov. 16, 1993, there had been no satisfactory way, either in terms of apparatus or method, of recovering certain metals, such as noble metals, in substantial quantities from certain types of ores, ore concentrates, anode mud, slag, and the like. The primary reason for this has been that the noble metals cannot be recognized.

It has been determined that noble metals may be unrecognizable in certain clusters. The clusters may be in primary ores or in the product of smelting processes or other processes from which certain types of metals are typically recovered, such as the processing of copper ores, iron ores, and the like.

While the chemical composition of the clusters is neither fully understood nor known, it is now recognized, primarily through the efforts and by means of the apparatus and method herein disclosed, that the unrecognizable metals, especially noble metals and rare earths, in the clusters may be freed from the clusters and may thus be either presented in the form of free atoms of the metals or may be alloyed with other metals. In both situations, the metals may be recognized and accordingly may be recovered through conventional recovery techniques.

The above referenced patents utilize an electron beam furnace to break down the clusters in order to recognize the noble metals in the clusters. Once the metals are able to be recognized, they may then be recovered by well known methods and apparatus.

The apparatus of the present invention utilizes a dc electric arc furnace and different procedures than the noted patents to break down the clusters in order to allow the noble metals to be recognized and thus recovered.

SUMMARY OF THE INVENTION

The invention described and claimed herein comprises apparatus and method for recognizing certain metals such as noble metals and rare earths, to enable the metals to be recovered by conventional recovery techniques. Base materials are exposed to a direct current arc in an electric arc furnace. Missing elections on the outer shells of atoms inside the clusters are added due to the dc arc. The clusters will disintegrate as soon as atoms in the clusters have the full electron configuration. There are trace metals and the metals may be alloyed with various metals in the base material. The metals are freed from the clusters in which they are unrecognizable through the dc arc furnace procedure and the metals may then be recovered by conventional metal recovery techniques which are well known and understood in the art.

Among the objects of the present invention are the following:

To provide new and useful apparatus for adding electrons to base materials for the recovery of noble metals therein;

To provide a new and useful method for the recovery of metals from base materials;

To provide new and useful method steps for the recognition of metals from base materials;

To provide new and useful dc arc furnace apparatus for recovering noble metals;

To provide new and useful apparatus and method for the recognition of metals in a base material; and To provide new and useful method and apparatus for the recognition of metals from clusters of materials in which the metals are unrecognizable.

BRIEF DESCRIPTION OF THE DRAWING

FIG. 2 is a view in partial section of furnace apparatus of the present invention.

DESCRIPTION OF THE PREFERRED EMBODIMENT

Figure 1:
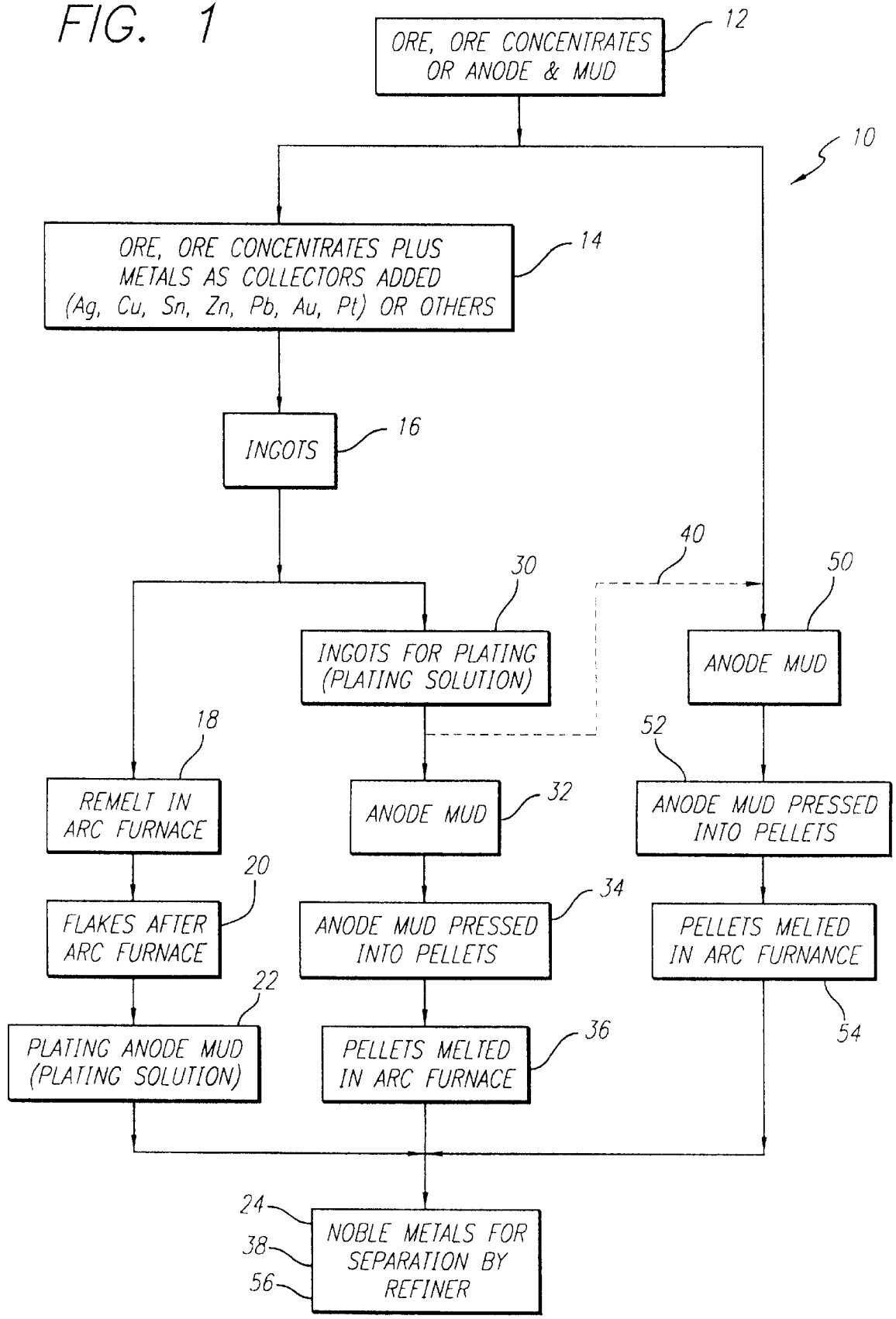
FIG. 1 is a block diagram of the method comprising the present invention.

FIG. 1 is a block diagram 10 illustrating the steps included in the method of the present invention. The block diagram 10 includes a plurality of blocks indicating the various steps taken, and generally three different methods are indicated. All of the three methods include a first common step, namely a step 12, which comprises the gathering of the starting materials. In the present invention, there are generally three types of starting materials. The three include raw ore, ore concentrates, or anode mud.

The ore may be crushed rock or the like. The ore concentrates may be the materials resulting from a smelting operation or the like.

The anode mud is a material resulting from a plating operation in which the mud is the material that falls to the bottom of a plating tank and is not transferred or plated onto the cathode in the plating process. This will be discussed in more detail below.

Two methods include common first steps for the ore or ore concentrates. This is indicated by a block 14. As is indicated in the block 14, ore or ore concentrates take a different path than does the anode mud starting material. In the case of ore or ore concentrates, it is not uncommon to add different types of metals as collectors. Different types of metals added as collectors include silver, copper, tin, zinc, lead, gold, platinum, or other metals.

The second step, and a step common to any ore or ore concentrates starting materials includes the formation of ingots from the ores or ore concentrates. This is indicated in block 16 of the method 10 of FIG. 1.

The ingots, which comprise the ore or ore concentrates, plus the added collector metals, may then take either of two paths, depending on various factors. These two paths comprise two of the three paths illustrated in FIG. 1.

The left path in FIG. 1 provides that the ingots from block 16 are melted in an electric arc furnace. This step is illustrated in block 18. That is, the ingots are sent directly to a dc electric arc furnace where they are melted. After the melting process in the electric arc furnace, block 20 indicates that flakes are formed after the electric arc furnace melting step. The flakes recovered or formed in block 20 are then used as an anode in a plating solution, comprising the step indicated by block 22.

In the plating step of block 22, anode mud is collected from the bottom of the plating tank. The anode mud, as indicated above, comprises a material which is not plated onto a cathode in the plating operation. The anode mud is removed from the plating tank and is then separated by well known techniques into the various metals contained in the anode mud. This is indicated in block 24 of FIG. 1.

The second method for the ore or ore concentrates utilizes the ingots from block 16 directly in a plating solution. This is illustrated in block 30 of FIG. 1. The ingots from block 16 are placed directly in a plating tank and the ingots, as indicated above, are utilized as an anode in the plating solution. The metals from the ingots which are not plated onto the cathode fall to the bottom of the tank as anode mud. This is indicated in block 32 of FIG. 1.

The anode mud of block 32 is collected from the plating tank and is pressed into pellets as indicated in block 34. The pellets of block 34 are then melted in the dc arc furnace, as indicated in block 36 of FIG. 1. The melting again results in flakes.

The flakes which result from the melting of the pellets in the dc arc furnace in step 36 are then separated by the standard separation techniques well known and understood in the art. This is indicated in block 38 of FIG. 1. The noble metal separation step of block(s) 24 and 38 is, as indicated above, well known and understood. The metals at this stage or these stages can now be recognized because they are broken down or separated from the clusters contained in the original starling materials, which include the ore, the ore concentrates, or anode mud, as indicated in block 12 of FIG. 1.

The anode mud starting material from block 12 comprises the beginning material for the third separation technique, as indicated in block 50 of FIG. 1. The anode mud from the block 50 is pressed into pellets, as indicated in block 52 of FIG. 1. The pellets from block 52 are then melted in the dc electric arc furnace, in accordance with block 54 of FIG. 1. The melted material from block 54 is then separated by the standard separation techniques discussed above, in accordance with the step of block 56 of FIG. 1.

It will be noted that the steps comprising blocks 50, 52, 54, and 56 are substantially identical to, or comparable to, the steps indicated in blocks 32, 34, 36, and 38 of FIG. 1, and which comprise the second method for the ore or ore concentrates starting materials after the starling materials are formed into ingots. A dashed line 40 in FIG. 1 indicates the correlation between methods 2 and 3.

It will be noted that blocks 24 38, and 56 of FIG. 1 all refer to "noble metals" to be separated. The term "noble metals" is therein and herein used in the broad sense as applying to all metals, including noble metals and rare earths, that are not generally recognized in the clusters from which they are freed by the method and apparatus of the present invention.

FIG. 2 is a view in partial section through a dc electric arc furnace 70 usable with the processes described above in conjunction with FIG. 1.

The furnace 70 includes a housing 71 which includes a base 72, and four walls extend upwardly from the base. Three of the walls are illustrated, including a wall 74, a wall 80, and a wall 86.

The wall 74 includes an opening 76 for a door or hatch 78. The wall 80 includes an opening 82 for a door or hatch 84.

The furnace housing 71 includes a top wall 88. Extending through the top wall 88 is a pipe or conduit 90 through which an inert gas is pumped into the interior of the housing. An opening 92 also extends through the top wall 88 and communicates with a vacuum pump 94. Finally, a safety valve 98 is also secured to the top wall 88 and communicates with the interior of the furnace housing.

The vacuum pump 94 is used for evacuating the interior of the furnace or furnace housing 71. A discharge conduit 96 extends from the vacuum pump 94. The conduit 96 is vented to the atmosphere.

The vacuum pump 94 is used to evacuate the furnace apparatus after an inert gas, such as argon, is pumped into the furnace through the pipe 90. Preferably, the furnace is pressurized and evacuated several times to insure that only the inert gas remains in the furnace. Finally, there is a slight positive pressure of the inert gas in the furnace during the melting procedure.

On the base 72 is a base support 100. The base support 100 includes a curved upper surface on which are disposed a plurality of roller elements or bearing elements 102 for supporting a cradle element 104. The cradle element 104 in turn supports a crucible 106. The crucible element 106 moves on the support 104 to pivot for discharging melted material onto a drum 140. From the drum 140 the melted material, flakes or ingots 132, falls into a container 150.

The crucible is charged with starling material 130 to be melted, as illustrated in block 12 of FIG. 1, through the opening 76. The flakes or ingots 132 are removed from the furnace in the container 150 through the opening 82.

The crucible 106 is closed by a top 108, and a pair of electrodes 110 and 116 extend through the top. The electrode 110 is connected to an appropriate power source 114 by a conductor 112. The electrode 116 is connected to the power source 114 by a conductor 118.

When the furnace apparatus 70 has been appropriately evacuated and charged with inert gas, as discussed above, the power source 114 is turned on and current flows through the material 130 to melt the material. After melting, the material is poured from the crucible 106 onto the water cooled drum 140. The drum 140 is connected to a pipe or conduit 142 through which cooling water flows into the drum. The melted material forms into flakes or ingots as it is cooled and falls into the container 150.

The melting of the material 130 by the arc furnace breaks the clusters by adding electrons to the outer shells of the atoms bound in the clusters. When the full configuration of electrons on the outer shells is obtained, the metals are freed and the clusters slowly disintegrate. The melted material, now in the form of flakes or clusters, may be appropriately separated as indicated in the steps of blocks 24, 38, and 56.

If the clusters are broken by the electric arc furnace 70 apparatus, the noble metals may be alloyed with other metals in the flakes or ingots. However, if such alloying takes place, the nobles metals will be recognized in the alloys or as alloys. They will not be unrecognized as they are in the clusters prior to the melting of the cluster material. As recognized materials, the noble metals may then be separated or recovered by standard procedures, as discussed above.

Obviously, the intensity of the electric arc furnace utilized in the apparatus of the present invention is controlled, as desired, by the appropriate power and control elements, not shown, but well known and understood.

Figure 3:
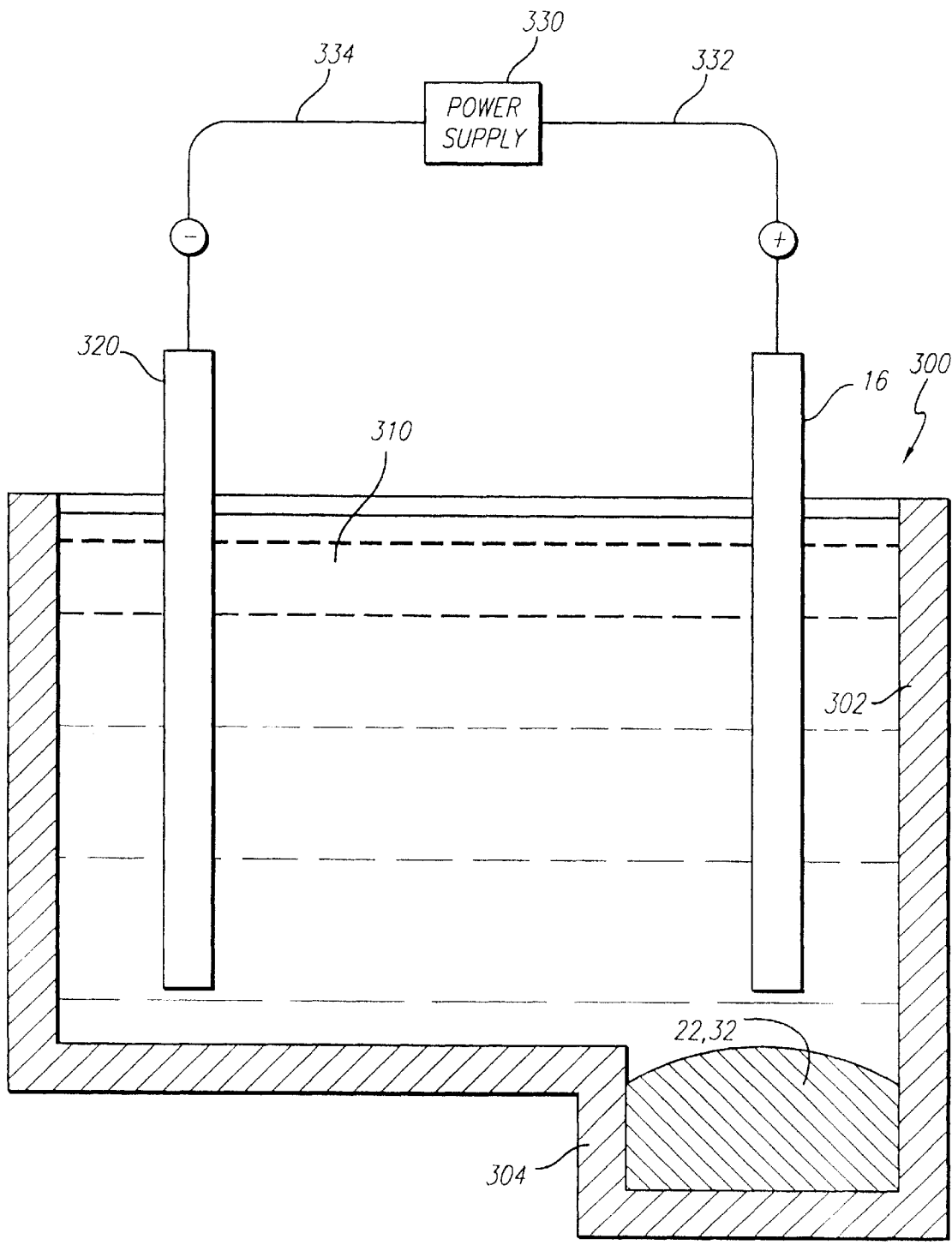
FIG. 3 is a schematic representation comprising a view in partial section of plating apparatus usable with the apparatus of FIG. 2 and the method illustrated in FIG. 1.

FIG. 3 is a view in partial section of plating apparatus 300 usable with the plating steps discussed above in conjunction with FIG. 1. The plating apparatus 300 includes a container or vat 302. At the bottom of the container or vat 302, and disposed beneath the anode, which is an ingot 16, is a sump 304. The container or vat 302 includes an electrolyte solution or plating solution 310. In addition to the anode ingot 16, a cathode 320 extends into the electrolyte 310 in the vat 302. The cathode 320 may be a stainless steel plate, a copper plate, nickel plate, or other appropriate metal plate, or the like.

A power supply 330 is connected to the ingot anode 16 and to the cathode 320 by a pair of conductors 332 and 334, respectively. During the electroplating operation, material from the anode or ingot 16 is transferred to the electrolyte or plating solution and is plated onto the cathode 320. Material which is not transferred or plated onto the cathode 320 falls into the sump 304. This material, or anode mud 22, 32, is then removed from sump 304 of the vat 302 and is pressed into pellets, as discussed above in conjunction with FIG. 1, and is then melted in a dc electric arc furnace, such as the furnace 70 of FIG. 2.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A method of freeing metals for recovery from clusters and material in which the metals are unrecognizable, comprising, in combination, the steps of providing material containing clusters having unrecognized metals to a DC electric arc furnace;

forming the material into first ingots;

subjecting the first ingots to an electric arc furnace to melt the first ingots and to provide electrons for the metals to free the metals from the clusters;

forming the incited material into second ingots;

providing a plating solution;

using a second ingot as an anode in the plating solution;

providing a cathode in the plating solution;

connecting a power supply to the anode and the cathode to plate material from the anode to the cathode and to provide unplated material as anode mud;

recovering anode mud from the plating solution; and separating the metals from the anode mud.

2. The method of claim 1 which includes the step of providing material includes the further step of adding metal as collectors to the material.

3. The method of claim 2 in which the provided material is selected from a class consisting of ore and ore concentrates having clusters containing unrecognized metals.

4. A method of freeing noble metals for recovery from clusters in which the metals are unrecognizable, comprising, in combination, the steps of:

providing material containing clusters having unrecognized metals to a DC electric arc furnace;

forming the material into an ingot;

providing a plating apparatus providing a plating solution in said plating apparatus;

using the ingot as an anode in the plating solution;

providing a cathode in the plating solution;

connecting a power supply to the anode and the cathode to plate material from the anode to the cathode and to provide unplated material as anode mud in said plating apparatus;

recovering the anode mud from the plating apparatus;

forming the anode mud into pellets;

melting the pellets by said DC electric arc furnace gun; and separating the metals from the melted pellets.

5. The method of claim 4 in which the step of providing material includes the step of adding metals as collectors.

6. The method of claim 5 in which the material is selected from a class consisting of ore and ore concentrates.

* * * * *